United States Patent Office 3,654,249
Patented Apr. 4, 1972

3,654,249
PROCESS FOR POLYMERIZING α-OLEFINS
Bernd Diedrich, Frankfurt am Main, and Wilhelm Dummer, Wiesbaden, Germany, assignors to Farbwerke Hoechst Aktiengesellschaft vormals Meister Lucius & Bruning, Frankfurt am Main, Germany
No Drawing. Filed June 25, 1969, Ser. No. 836,585
Claims priority, application Germany, Mar. 13, 1969,
P 19 12 706.1
Int. Cl. C08f 1/56, 3/06
U.S. Cl. 260—88.2
8 Claims

ABSTRACT OF THE DISCLOSURE

The invention provides a process for homopolymerizing or copolymerizing ethylene in the presence of mixed catalysts comprising as component A the reaction product of 0.1 to 1.0 part by weight of $Mg(OH)_2$, 1 part by weight of $Ti(O—isoC_3H_7)_4$ and 0.4 to 0.9 part by weight of $TiCl_4$ and as component B an organo-aluminum compound. Under a pressure of up to 20 atmospheres the polymer yields are so high per unit of catalyst that the residues thereof need not be removed. By variation of the proportions of $Mg(OH)_2$ to titanium compounds polymers having densities in the industrially interesting range of from 0.952 to 0.962 g./cc. can be obtained.

---

It is known to polymerize α-olefins and mixtures thereof by the Ziegler low pressure polymerization process. The catalysts used in this process are mixtures of compounds of the elements of sub-groups IV to VI of the Periodic Table according to Mendeleeff and organo-metal compounds of the elements of Groups I to III of the Periodic Table. In general, the polymerization is carried out in suspension, in solution, or in the gaseous phase.

Processes have been proposed in which the catalyst components are used in combination with a carrier material. According to the process disclosed in French Pat. 1,198,422 the compounds of sub-groups IV to VI of the Periodic Table are mixed with carrier materials such as bentonite, pumice, kieselguhr, calcium phosphate or silica gel, and then reduced with organo-aluminum compounds. In this process the polymerization takes place independent of the type of carrier material used, only the composition of the catalyst fixed on the carrier material is of importance. A disadvantage of this method is, above all, the necessity to remove the catalyst and the carrier material before the polymers are further processed.

In other patent specifications it has been stated that a specific composition and nature of the carrier material is necessary to obtain a sufficient activity of the catalyst. In Belgian Pat. 609,261, for example, alkali earth metal phosphates are used which, prior to being reacted with titanium or vanadium compounds, must be heated at 200 to 1000° C. to obtain an activity that is sufficient for polymerization. In spite of this procedure the yield of polymer is very low. In Belgian Pat. 650,679 and French Pat. 1,448,320 hydroxychlorides of bivalent metals of the general formula Me(OH)Cl, are used as carrier materials for Ziegler catalysts. It is said that when the carrier is reacted with the transition metal component a chemical reaction takes place, for example according to the following equation:

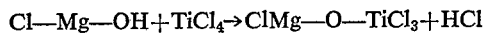

Cl—Mg—OH + $TiCl_4$ → ClMg—O—$TiCl_3$ + HCl

Higher polymer yields can only be obtained when the polymerization is carried out under a pressure of about 20 atmospheres gauge. The process has the disadvantages that the preferably used Mg(OH)Cl must be prepared in rather complicated manner by very cautious stepwise dehydration of $MgCl_2 \cdot 6H_2O$ at 285° C. and that the carrier material used has a relatively high chlorine content.

In German Pat. 1,214,653 a process for the manufacture of catalysts supported on a carrier has been proposed according to which specific heavy metal compounds of the metals of Groups IVa, Va, VIa, VIIa and VIII of the Periodic Table are allowed to act on pyrogenic metal oxides or nonmetal oxides, preferably pyrogenic alumina, pyrogenic titanium dioxide or pyrogenic silica, which have the function of a carrier and the surfaces of which contain hydroxyl groups. The mean particle size of the carrier material should be less than about 0.1 micron and the concentration of hydroxyl groups should be so high that the hydroxyl groups react with at least $1 \times 10^{-4}$ equivalent of the transition metal per gram of carrier material.

Even if carried out under a pressure of 190 atmospheres gauge the polymerization gives such a low yield that a subsequent removal of catalyst and carrier material from the polymer is indispensable when an industrially useful product shall be produced.

Polymerizations according to the Ziegler process with catalysts supported on carriers can only be performed in an economic manner when the polymer can be further processed without removal of catalyst and carrier. This is only possible if high polymer yields are obtained per catalyst unit and the polymer does not contain too high a proportion of chlorine which would involve coloration of the polymer and corrosion of the processing machines.

The present invention provides a process for polymerizing ethylene or mixtures of ethylene with up to 10% by weight, preferably up to 5% by weight, of α-olefins of the general formula $R—CH=CH_2$, in which R stands for a branched or straight-chain hydrocarbon radical having 1 to 13 carbon atoms, preferably 1 to 8 carbon atoms, in solution, in suspension or in the gaseous phase at a temperature in the range of from 20 to 120° C., preferably 60 to 100° C., under a pressure of up to 20 atmospheres, preferably 1.5 to 8 atmospheres, in the presence of a mixed catalyst consisting of the reaction product of a titanium compound with an inorganic solid (component A) and an organo-aluminum compound (component B) optionally with regulation of the molecular weight by means of hydrogen, which comprises carrying out the polymerization in the presence of a mixed catalyst component A of which has been obtained by reacting 0.1 to 1.0 part by weight of $Mg(OH)_2$ with 1 part by weight of $Ti(O—isoC_3H_7)_4$ and 0.4 to 0.9 part by weight of $TiCl_4$.

It is very surprising and could not be expected that the reaction products of $Mg(OH)_2$ with the titanium compounds used according to the invention represent highly active catalysts, the more so as in Belgian Pat. 650,679 it has been expressly been stated that active catalysts cannot be obtained when instead of Mg(OH)Cl as carrier other bivalent metal compounds containing hydroxyl groups, for example hydroxides, are used. Quite contrary thereto, the catalysts used according to the invention are considerably more active than catalysts with Mg(OH)Cl.

Component A may be prepared by adding 1 part by weight of $Ti(O—isoC_3H_7)_4$ at a temperature of 20 to 90° C. to 0.1–1.0 part by weight of $Mg(OH)_2$ in an inert dispersion medium and dropping into the suspension while stirring 0.4–0.9 part by weight of $TiCl_4$. To complete the reaction the suspension is stirred for some time at 40 to 90° C. The time of stirring depends on the temperature and the desired degree of conversion, in most cases it is in the range of from 3 to 20 hours.

The concentration of the titanium component fixed on the magnesium compound is advantageously within the range of from 0.005 to 1.5, preferably from 0.03 to 0.8 mmols, per liter of dispersing agent or reactor volume. Generally, even higher concentrations are possible.

The reaction product of Mg(OH)₂ and titanium compound which is insoluble in the inert dispersion media is freed from unreacted titanium compound by repeatedly washing with an inert dispersion medium.

Alternatively, component A may be prepared by adding simultaneously the indicated amounts of Ti(O—iso(C₃H₇)₄ and TiCl₄ to the Mg(OH)₂ suspended in an inert dispersion medium and further stirring the suspension obtained at 40 to 90° C., the insoluble reaction product is then washed as described above.

Suitable inert diluents are, for example, aliphatic or cycloaliphatic hydrocarbons such as butane, pentane, hexane, heptane, cyclohexane, methylcyclohexane, as well as aromatic hydrocarbons such as benzene or xylene. It is likewise possible to use fractions of hydrogenated Diesel oil which have been carefully freed from oxygen, sulfur compounds and moisture.

Mg(OH)₂ used for preparing component A can be obtained in known manner by reacting alkali metal or alkaline earth metal hydroxides such as KOH, NaOH, LiOH, Ca(OH)₂, Sr(OH)₂, Ba(OH)₂, with aqueous solutions of magnesium salts, for example MgCl₂, MgSO₄, Mg(NO₃)₂ with subsequent drying, for example by heating at a temperature of from 100 to 220° C., possibly under reduced pressure.

The magnesium hydroxide used should expediently have an average particle size of 0.1 to 150 microns, preferably 1 to 100 microns.

Prior to being reacted with the titanium compound the magnesium hydroxide may be reacted with other inert inorganic solids that do not inhibit the polymerization. Solids of this type are metal compounds such as oxides, hydroxides, halides, sulfates, carbonates, phosphates, silicates, more particularly alkaline earth metal oxides, for example CaO, Al(OH)₃, fluorides and chlorides, for example MgF₂, AlCl₃, ZnCl₂, NiCl₂, alkaline earth metal carbonates such as BaCO₃, alkaline earth metal phosphates, for example Ca₃(PO₄)₂, apatite, or talc.

The molar ratio of magnesium hydroxide to inorganic solid may vary within wide limits, a range of from 1:0.05 to 1:0.9 and more particularly 1:0.08 to 1:0.5 being preferred.

The tetravalent titanium compound in component A is suitably transformed into the polymerization-active compound having a lower valence during the course of polymerization by adding the organo-aluminum compound (component B) at a temperature of from 20 to 120° C., preferably 60 to 100° C.

It is likewise possible, however, to treat component A with the organo-aluminum compound prior to polymerization at a temperature of from −30 to 100° C., preferably 0 to 20° C. When chlorine-containing organo-aluminum compounds are used, it is advantageous, however, to wash the reaction product obtained. It is then activated with the organo-aluminum compound at a temperature of from 20 to 120° C., preferably 60 to 100° C.

Suitable organo-aluminum compounds are the reaction products of aluminum trialkyls or dialkyl aluminum hydrides with hydrocarbon radicals having 1 to 16 carbon atoms, preferably Al(isobutyl)₃ or Al(isobutyl)₂H and diolefins containing 4 to 20 carbon atoms, preferably isoprene, for example aluminum isoprenyl.

As component B there may also be used chlorine-containing organo-aluminum compounds, for example dialkyl-aluminum monochlorides of the formula R₂AlCl or alkyl-aluminum sesquichlorides of the formula R₃Al₂Cl₃ in which R stands for identical or different hydrocarbon radicals, preferably alkyl radicals having 1 to 16, advantageously 2 to 12 carbon atoms, for example (C₂H₅)₂AlCl, (isoC₄H₉)₂AlCl or (C₂H₅)₃Al₂Cl₃.

As component B there are preferably used aluminum trialkyls of the formula AlR₃ or dialkyl aluminum hydrides of the formula AlR₂H in which R stands for identical or different hydrocarbon radicals, preferably alkyl radicals having 1 to 16 and advantageously 2 to 6 carbon atoms, such as Al(C₂H₅)₃, Al(C₂H₅)₂H, Al(C₃H₇)₃, Al(C₃H₇)₂H, Al(isoC₄H₉)₃ or Al(isoC₄H₉)₂H.

The organo-aluminum activator can be used in a concentration of from 0.5 to 10 millimoles, preferably 2 to 4 millimoles per liter of dispersion medium or per liter of reactor volume.

The polymerization is carried out in solution, in suspension or in the gaseous phase either continuously or discontinuously at a temperature in the range of from 20 to 120° C., preferably 60 to 100° C. under a pressure of up to 20 atmospheres, preferably 1.5 to 8 atmospheres.

The polymerization in suspension is carried out in the inert diluents generally used for Ziegler low pressure polymerizations as defined above for the preparation of component A of the catalyst.

Olefins that can be polymerized by the process of the invention are ethylene or mixtures of ethylene with up to 10% by weight, preferably up to 5% by weight of α-olefins of the general formula R—CH=CH₂ in which R stands for a branched or straight-chain hydrocarbon radical, preferably an alkyl radical, with 1 to 13 and preferably 1 to 8 carbon atoms. Olefins of this type are preferably propylene, butene-(1), pentene-(1) and 4-methylpentene-(1).

The molecular weight of the polymers can be regulated in known manner by adding regulators, preferably hydrogen.

The titanium catalysts according to the invention offer special advantages in the homopolymerization of ethylene because the density of the polyethylene can be adjusted in the industrially interesting range of from 0.952 to 0.962 g./cc. by simply varying the proportions of Mg(OH)₂ and titanium compound within the indicated limits.

When ethylene is homopolymerized, for example, using a titanium catalyst prepared by reacting 0.4 part of Mg(OH)₂, 1 part of Ti(O—isoC₃H₇)₄ and 0.67 part of TiCl₄, a polyethylene is obtained having a density of 0.953 g./cc., whereas a titanium catalyst prepared from 0.2 part of Mg(OH)₂, 1 part of Ti(O—isoC₃H₇)₄ and 0.67 part of TiCl₄ yields a polyethylene having a density of 0.962 g./cc.

Moreover, by reacting Mg(OH)₂, Ti(O—isoC₃H₇)₄ and TiCl₄ in the specified proportions, catalysts are obtained which are especially effective and yield high amounts of polymers of ethylene or copolymers of ethylene with up to 10% by weight of α-olefins. Even if the catalyst fully remains in the polymer the color thereof is excellent.

Hence, in the case of polymerization in suspension complicated operations may be dispensed with, such as decomposition of the catalyst, removal of the catalyst and carrier material and the like. After filtration to remove the dispersion medium the polymer is dried and directly further processed without additional treatment. The very low amounts of catalyst and carrier in the polymer do neither discolor the polymer nor corrode the processing machines.

As compared therewith, in the processes of Belgian Pat. 650,679 and French Pat. 1,448,320 considerably lower yields are obtained per gram of MgOHCl on which the TiCl₄ is fixed, even under a pressure of 20 atmospheres gauge—higher polymerization pressures naturally give higher yields—so that products having satisfactory properties can only be obtained when the catalyst is subsequently removed from the polymer. According to the cited French patent 1 gram of MgOHCl on which the TiCl₄ is fixed yields at most 1.5 kilograms of polymer under 20 atmospheres gauge whereas in the present process 3 to 25 kilograms of polymer are obtained under a pressure of 5 to 9 atmospheres per gram of Mg(OH)₂ on which the titanium compound is fixed.

A further advantage of the process of the invention is that the magnesium hydroxide used can be more readily obtained than MgOHCl which must be prepared by very careful gradual dehydration of $MgCl_2 \times 6H_2O$ at 285° C.

Moreover, the magnesium hydroxide does not contain chlorine as is the case with MgOHCl so that the polymers obtained by the process of the invention have much better corrosion values with the same content of carrier material.

The following examples serve to illustrate the invention but they are not intended to limit it thereto.

EXAMPLE 1

(a) Preparation of catalyst 190 grams (1 mole) of titanium tetrachloride were added dropwise at 50° C. while stirring over a period of 1 hour in a nitrogen atmosphere to a mixture of 58.4 grams (1 mole) of $Mg(OH)_2$ which had been dried for 10 hours at 200° C., 2000 milliliters of a hydrogenated Diesel oil fraction boiling at 130 to 150° C. and 284 grams (1 mole) of tetraisopropyl titanate. The suspension was further stirred for 15 hours at 85° C. in a nitrogen atmosphere whereupon the precipitate was washed by decanting and stirring 6 times at 50° C., each time with 1500 milliliters of the hydrogenated Diesel oil fraction. The volume of the suspension was made up to 2000 milliliters and the titanium content was determined colorimetrically with hydrogen peroxide (cf. G. Müller "Praktikum der quantitativen chemischen Analyse," 4th edition (1957), p. 243). 10 milliliters of suspension contained 3.2 millimoles of titanium compound.

(b) Polymerization of ethylene 100 liters of a hydrogenated Diesel oil fraction boiling at 130 to 150° C. were introduced into a 200 liter Pfaudler vessel and the air in the vessel was replaced by nitrogen while stirring. At 80° C. the Diesel oil was saturated with ethylene and hydrogen was then introduced until the pressure in the vessel was 2 atmospheres. After pressure release 54 grams (400 millimoles) of $Al(C_2H_5)_3$ and 60 milliliters of the above catalyst suspension were added. At 85° C. 5 kilograms of ethylene were introduced per hour together with hydrogen in an amount such that the gaseous phase contained 15% by volume thereof. During the course of polymerization the pressure rose to about 9 atmospheres. After 8 hours the polyethylene formed was separated from the dispersion medium by filtration in a pressure filter and dried. 38 kilograms of polyethylene having a reduced specific viscosity of 3.1, determined with a 0.1% solution in decahydronaphthalene at 135° C. and a density of 0.962 g./cc. were obtained. 22 kilograms of polyethylene were thus obtained per gram of $Mg(OH)_2$ used. The polymer had excellent color and corrosion values.

EXAMPLE 2

(a) Preparation of catalyst 190 grams (1 mole) of titanium tetrachloride were added dropwise over a period of 1 hour at 50° C. and while stirring in a nitrogen atmosphere to a mixture of 116.8 grams (2 moles) of $Mg(OH)_2$ which had been dried for 10 hours at 200° C., 2000 milliliters of a hydrogenated Diesel oil fraction boiling at 130 to 150° C. and 284 grams (1 mole) of tetra-isopropyl titanate. The suspension was stirred for 15 hours at 85° C. in a nitrogen atmosphere. The precipitate was then washed by decanting and stirring 6 times at 50° C., each time with 1500 milliliters of the hydrogenated Diesel oil fraction. The volume of the suspension was then made up to 2000 milliliters and the titanium content was determined colorimetrically with hydrogen peroxide. 10 milliliters of suspension contained 4.6 millimoles of titanium compound.

(b) Polymerization of ethylene

Ethylene was polymerized under the conditions specified in Example 1 using 60 milliliters of the above catalyst suspension. 38 kilograms of polymer were obtained having a reduced specific viscosity of 2.8, determined with a 0.1% solution in decahydronaphthalene at 135° C. and a density of 0.953 g./cc.

EXAMPLE 3

(a) Preparation of catalyst 58.4 grams (1 mole) of $Mg(OH)_2$ were suspended in 2000 milliliters of a hydrogenated Diesel oil fraction boiling at 130 to 150° C. and while stirring in a nitrogen atmosphere 284 grams (1 mole) of tetraisopropyl titanate and 190 grams (1 mole) of titanium tetrachloride were dropped in simultaneously at 50° C. over a period of 2 hours. The suspension was then stirred for 15 hours at 85° C. under nitrogen, the precipitate was washed by decanting and stirring 6 times at 50° C., each time with 1500 milliliters of the hydrogenated Diesel oil fraction. The volume of the suspension was then made up to 2000 milliliters and the titanium content was determined colorimetrically with hydrogen peroxide. 10 milliliters of suspension contained 2.0 millimoles of titanium compound.

(b) Reaction of the catalyst with ethyl-aluminum sesquichloride

With the exclusion of air and moisture a solution of 30 millimoles of $Al_2(C_2H_5)_3Cl_3$ (7.41 grams) in 50 milliliters of Diesel oil was dropped at 20° C. over a period of 1 hour to 100 milliliters of the above catalyst suspension and the whole was further stirred for 2 hours at 20° C. A bluish black precipitate formed which was washed 4 times, each time with 100 milliliters of Diesel oil. The volume of the suspension was made up to 100 milliliters.

(c) Copolymerization of ethylene with butene-(1)

Under the conditions specified in Example 1, 5 kilograms of ethylene and 100 grams of butene-(1) were copolymerized per hour using 90 milliliters of the above catalyst suspension and 79.2 grams (400 millimoles) of aluminum triisobutyl. Hydrogen was introduced in an amount such that the proportion thereof in the gaseous phase amounted to 15% by volume.

After 8 hours 40 kilograms of an ethylene/butene copolymer were obtained having a reduced specific viscosity of 2.8, determined in a 0.1% solution in decahydronaphthalene at 135° C.

EXAMPLE 4

(a) Reaction of the supported catalyst with aluminum triethyl

With the exclusion of air and moisture a solution of 40 millimoles (5.4 grams) of $Al(C_2H_5)_3$ in 50 milliliters of Diesel oil was added dropwise at 40° C. over a period of 2 hours to 100 milliliters of the catalyst suspension of Example 1a and the mixture was stirred for another 2 hours at 40° C. A bluish black precipitate formed.

(b) Polymerization of ethylene/propylene 5 kilograms of ethylene and 80 grams of propylene were copolymerized per hour under the conditions specified in Example 1 using 80 milliliters of the above catalyst suspension and 56.8 (400 millimoles) of diisobutyl aluminum hydride. Hydrogen was introduced in an amount such that the gaseous phase contained 15% by volume thereof.

After 8 hours 39 kilograms of an ethylene/propylene copolymer having a reduced specific viscosity of 3.1, determined in a 0.1% solution in decahydronaphthalene at 135° C., were obtained.

What is claimed is:

1. In a process of polymerizing ethylene or mixtures of ethylene with up to 10% by weight of α-olefins of the formula $R-CH=CH_2$, in which R stands for a branched or straight-chain hydrocarbon radical having 1 to 13 carbon atoms, in solution, in suspension or in the gaseous phase, at a temperature in the range of from 20 to 120°

C., under a pressure of up to 20 atmospheres, in the presence of a mixed catalyst comprising the reaction product of a titanium compound and an inorganic solid (component A) and an organo-aluminum-compound (component B), the improvement which comprises carrying out the polymerization in the presence of a mixed catalyst, component A of said mixed catalyst being the hydrocarbon insoluble product obtained by reacting 1 part by weight of $Ti(O\text{—}isoC_3H_7)_4$ with 0.4 to 0.9 part by weight of $TiCl_4$ in the presence of 0.1 to 1.0 part by weight of $Mg(OH)_2$.

2. The process of claim 1, wherein component B is an aluminum trialkyl of the formula $Al(R)_3$ or a dialkyl-aluminum hydride of the formula $Al(R)_2H$ in which R stands for identical or different hydrocarbon radicals having 1 to 16 carbon atoms.

3. The process of claim 1, wherein component A has been prepared at a temperature in the range of from 20 to 90° C.

4. The process of claim 1, wherein ethylene is co-polymerized with propylene, butene-(1) or 4-methyl-pentene-(1).

5. The process of claim 1 wherein the molecular weight of the resulting polymer is controlled by means of hydrogen.

6. The process of claim 1 wherein component B has the formula $R_2AlCl$ or $R_3Al_2Cl_3$ in which R stands for identical or different alkyl radicals having 1 to 16 carbon atoms.

7. The process of claim 1 wherein component B has the formula $AlR_3$ or $AlR_2H$ wherein R is alkyl having 2 to 6 carbon atoms.

8. The process of claim 7 wherein component B is $Al(C_2H_5)_3$, $Al(C_2H_5)_2H$, $Al(C_3H_7)_3$, $Al(C_3H_7)_2H$, $Al(isoC_4H_9)_3$ or $Al(isoC_4H_9)_2H$.

References Cited

UNITED STATES PATENTS 2,986,531    5/1961    Schreyer _____ 260—94.9

FOREIGN PATENTS 1,095,110    12/1967    Great Britain.
1,560,467    2/1969    France.

JOSEPH L. SCHOFER, Primary Examiner

E. J. SMITH, Assistant Examiner

U.S. Cl. X.R.

252—429 C; 260—94.9 DA, 94.9 E